Oct. 1, 1968  J. AURIOL  3,403,762

FREEWHEEL DEVICES

Filed May 12, 1967  4 Sheets-Sheet 1

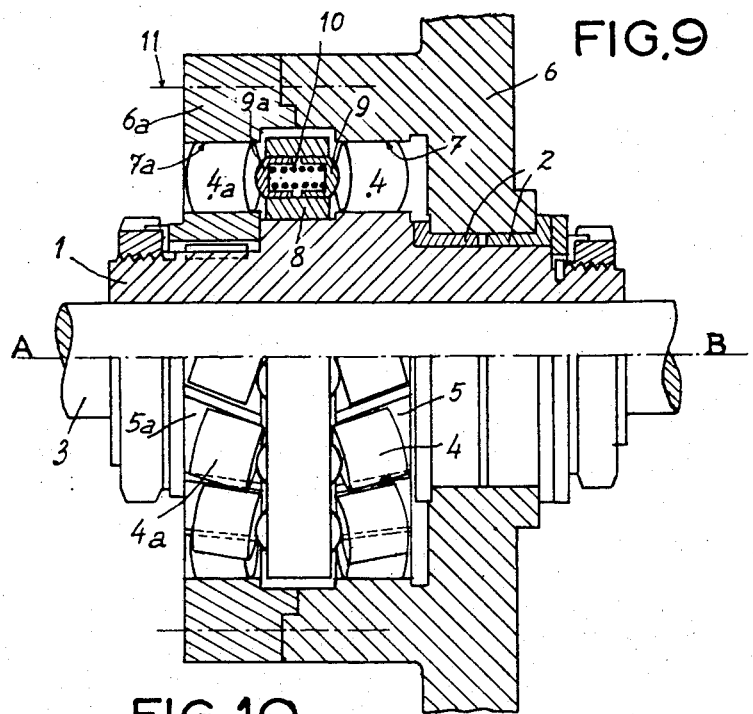
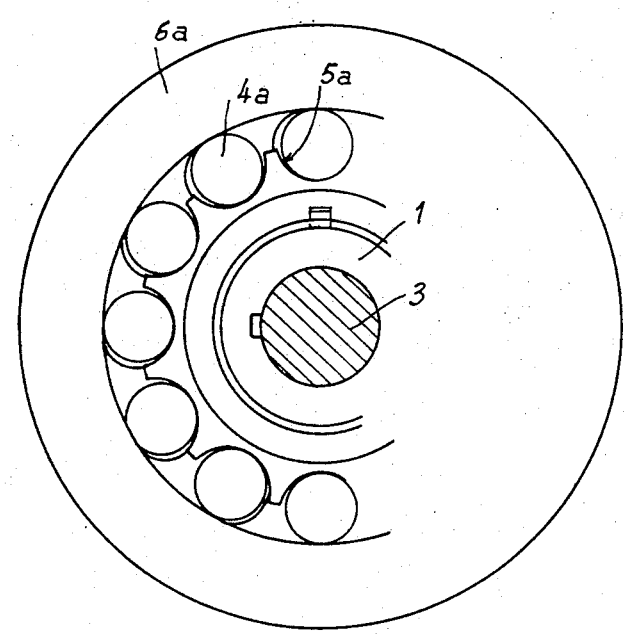

United States Patent Office 3,403,762
Patented Oct. 1, 1968

3,403,762
FREEWHEEL DEVICES
Jean Auriol, Billancourt, France, assignor to Regie Nationale des Usines Renault, Billancourt, France
Filed May 12, 1967, Ser. No. 638,093
Claims priority, application France, June 13, 1966, 65,205
4 Claims. (Cl. 192—45)

ABSTRACT OF THE DISCLOSURE

Freewheel device of the type comprising an inner race member mounted on a shaft, an outer race member, rolling and locking members, such as balls or rollers, urged by spring means against said races, said freewheel device being characterised in that said rolling members urged in a substantially axial direction by separate springs means are housed in separate grooves inclined to axis of said shaft and formed in one of said race members.

---

This invention relates to freewheel devices of the type comprising an inner race mounted on a shaft, an outer race, and rolling and locking members, such as balls or rollers, constantly urged by spring means against said races, the freewheel device according to this invention being characterised essentially in that the rolling members urged in a substantially axial direction by separate springs are housed in axial grooves slightly inclined to the shaft axis, which are formed in one of said races.

Under these conditions, the maximum number of balls or rollers may be contemplated for a predetermined freewheel diameter, as the transfer of said springs to a lateral position permits of disposing said balls or rollers side by side. On the other hand, each rolling member urged by a separate spring is in constant and close engagement with the inner and outer races of the device. The freewheel device according to this invention is therefore capable of supporting the maximum load. Moreover, this device is simple to disassemble and its component elements are particularly easy to machine, as the straight or helical grooves contain standard balls or rollers. Finally, the number of these balls or rollers may be doubled by providing tandem races, without appreciable increasing the over-all dimensions of the device, as each spring (which can have relatively large dimensions due to the space available therefor) acting against two balls or rollers.

In order to afford a clearer understanding of this invention and of the manner in which the same may be carried out in practice, a few forms of embodiment thereof will now be described by way of example with reference to the accompanying diagrammatical drawing, in which:

FIGURES 3, 5 and 9 are views similar to FIGURE 1 but showing three modified forms of embodiment of the freewheel device of this invention;

FIGURES 4, 6 and 10 are end views similar to FIGURE 2 of the three forms of embodiment shown in FIGURES 3, 5 and 9 respectively;

FIGURE 6 is a detail view showing the rolling members of the freewheel device illustrated in FIGURE 5.

Figure 1:
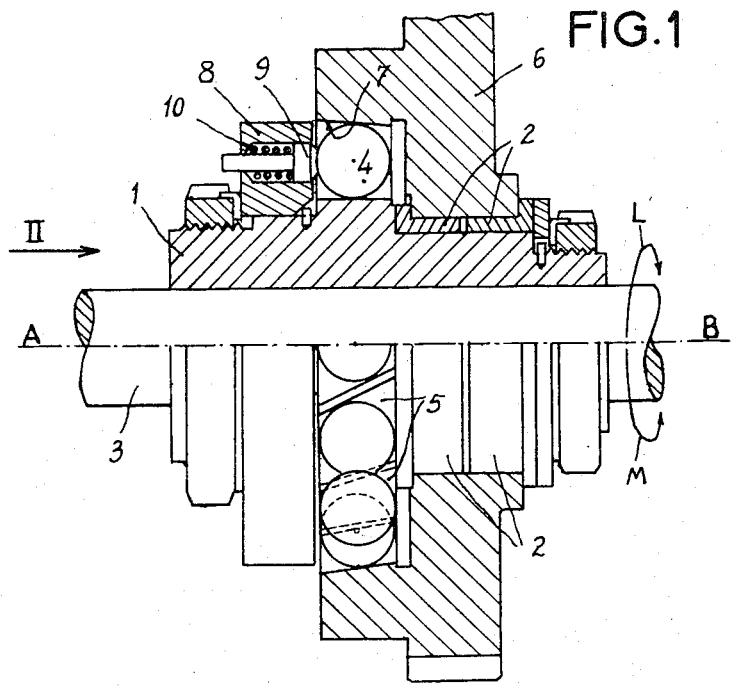
FIGURE 1 is a part-elevational, part sectional view of a first form of embodiment of a freewheel device constructed according to the teachings of this invention, the section being taken along the line I—I of FIGURE 2.
Figure 2:
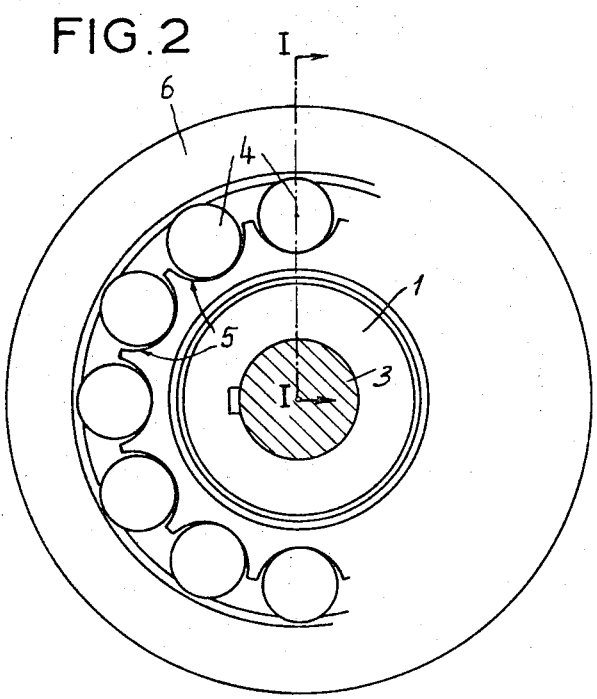
FIGURE 2 is an end view taken in the direction of the arrow II of the freewheel device shown in FIGURE 1, from which the annular spring carrier has been removed for the sake of clarity.

Referring first to FIGURES 1 and 2 of the drawing, it will be seen that the freewheel device according to this invention comprises a socket 1 constituting the inner race keyed on the drive shaft 3 revolving about an axis AB, an annular set of balls 4 disposed at relatively close peripheral intervals in grooves 5 advantageously of helical configuration formed in the outer portion of the inner race 1, the bottom of these grooves having preferably a semi-circular cross-sectional contour; an outer race 6 comprising a slightly tapered bore 7 engaging the circular set of balls 4, and an annular spring carrier or like member 8 comprising in front of each ball 4 a headed pin 9 urged thereagainst by a spring 10, all the springs 10 being adapted, in the inoperative position and separately, to urge the balls 4 for engagement with the tapered bore 7, and to take due account of the variation in diameter of these balls, notably as far as machining tolerances are concerned.

This slightly tapered bore 7 is concentric to the socket 1 and shaft 3.

In the drawing, the frictional contact is coped with by means of antifriction rings or bushings 2.

The above-described device operates as follows:

When the socket 1 or the outer race 6 are driven in the direction of the arrow L (FIGURE 1), the balls 4 urged by the springs 10 against the tapered bore 7 are moved in the axial direction towards the smaller diameter of the tapered bore 7, so that the balls 4 are wedged and the inner and outer races revolve as one (drive).

If on the contrary the socket 1 or the outer race 6 are caused to rotate in the opposite direction (arrow M, FIGURE 1), the balls 4 are moved towards the spring-loaded headed pins 9, against the pressure of springs 10. Thus, the balls are moved away from the tapered bore 7 and the outer race 6 or socket 1 is not driven (over-run).

The advantageous feature characterising the freewheel device of this invention lies in the considerably greater number of balls 4 that can be used therein, as compared with hitherto known devices of this type; this is due to the fact that the springs 10 urging the balls 4 are disposed laterally, not between the balls or similar rolling and locking member. It will be noted that if desired these springs may have greater dimensions. Moreover, the unitary pressure produced between each ball and the socket 1 may be considerably greater due to the rounded contour of the bottom of each groove 5 which prevents its penetration, as contrasted with the flat portion frequently used in conventional devices which promotes this detrimental penetration at a point where, due to the relatively reduced diameter, a particularly considerable force is necessary for transmitting the drive torque.

Figure 3:
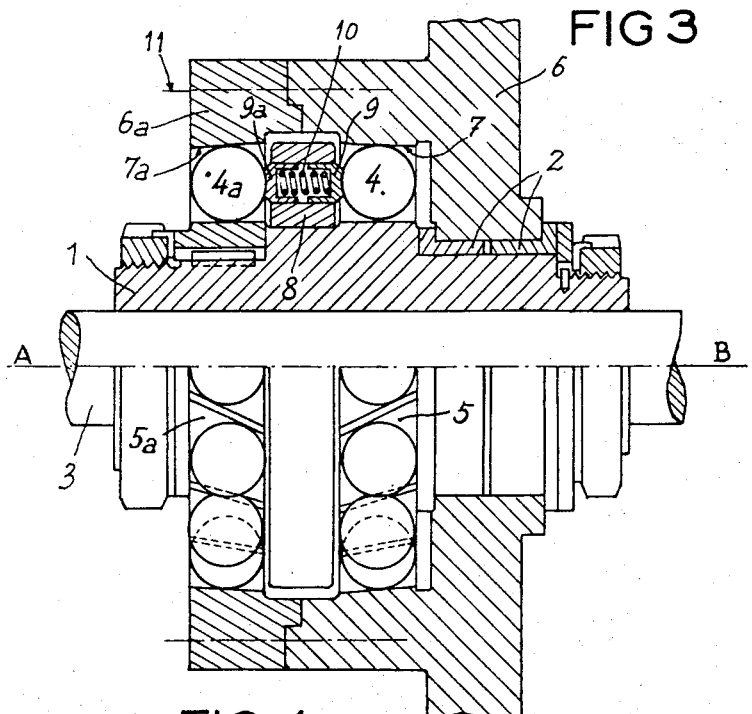
Figure 4:
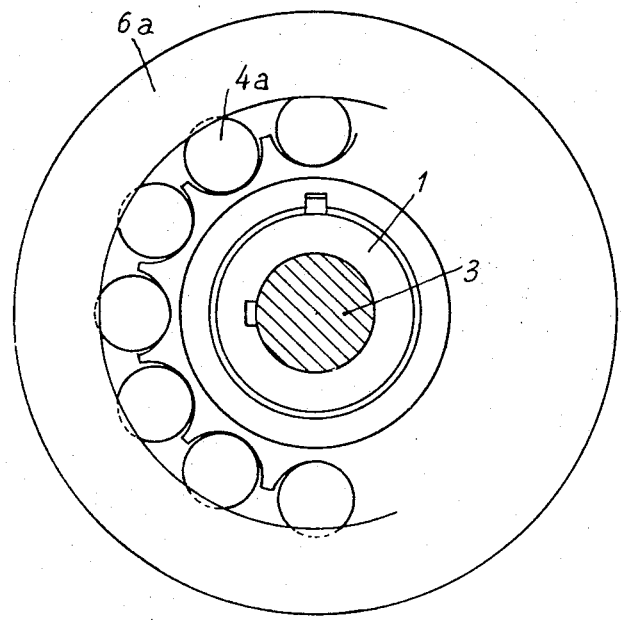

In the alternate form of embodiment illustrated in FIGURES 3 and 4 of the drawing the outer race comprises two sections 6 and 6a assembled by means of suitable members 11 and formed with slightly tapered bores 7 and 7a. On the inner races 5 and 5a the helical grooves are inclined in opposite directions with respect to the shaft axis. Each spring 10 housed in the annular carrier 8 urges a pair of opposite headed pins 9, 9a engaging corresponding balls 4 and 4a and urging these balls against the bores 7 and 7a in the inoperative position of the freewheel device. As a result, the load capacity of this freewheel device is twice that of the form of embodiment illustrated in FIGURES 1 and 2, without appreciably increasing its over-all dimensions.

Figure 5:
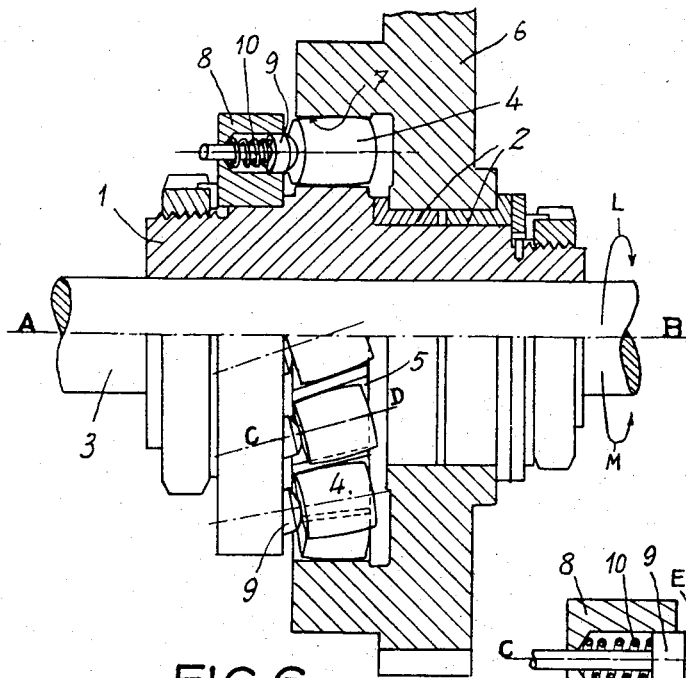
Figure 6:
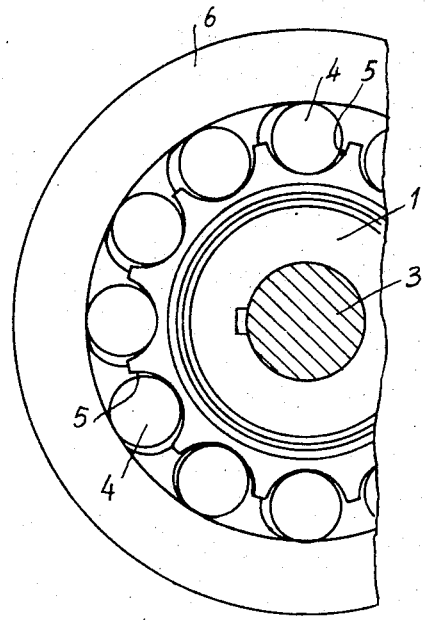
Figure 7:
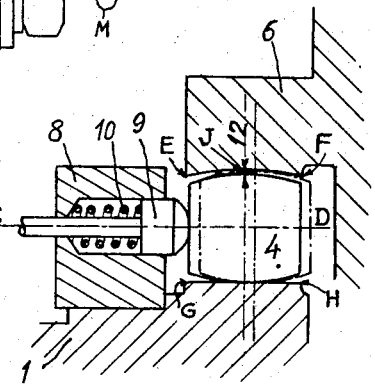
FIGURE 7 is a section taken along the axis CD, showing the mode of operation of the freewheel device of FIGURE 5.
Figure 8:
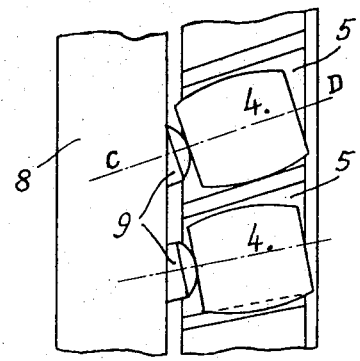
FIGURE 8 is an enlarged section of a portion of FIGURE 5.

In another form of embodiment illustrated in FIGURES 5 and 6 the rolling members 4 consist of rollers having an axis CD; preferably, these rollers are barrelshaped and received in advantageously rectilinear grooves 5 preferably of semi-circular cross-sectional contour; these grooves are directed obliquely in relation to the axis AB of shaft 2. Moreover, the bore 7 is cylindrical and a predetermined play 12 (see FIGURE 7) is provided between this bore 7 of a width EF and one of the rollers 4, when the portion of major diameter of this roller engages the bottom of the groove 5 extending from G to H, in the middle thereof. The line GH is a straight segment lying in a plane parallel to AB, and the line EF is an elliptic arc having its ends E and F nearer to the aforesaid line GH than its middle point J.

Under these conditions, when the socket 1 is driven in the direction of the arrow L (FIGURE 5), the roller 4 urged by spring 10 and the wall of groove 5, contacts the bore 7 and takes a bearing thereagainst and also against the wall of groove 5. In fact, the play 12 is so calculated that the mutual inclination of said bore 7 and the groove wall, at the points of contact of roller 4, be inferior to the frictional angle of the materials utilised for constituting the inner and outer races and also the rolling members 4.

The same applies in case the outer race 6 were the driving member and revolved in the direction of the arrow L.

If on the other hand the socket 1 were rotatably driven in the opposite direction (arrow M) the wall of each groove 5 will urge the roller 4 against the headed pin 9, the contact between the roller 4 and the socket 1 being maintained just enough to compensate the force of spring 10.

It will be noted that as in the form of embodiment shown in FIGURES 3 and 4 the number of rollers 4 (FIGURES 9 and 10) can be doubled, each spring 10 reacting simultaneously against two of these rollers.

Moreover, the barrel shape of the rollers is not compulsory for balls or taper rollers may also be used, if desired.

The inclination of the headed pins 9 is also not compulsory and if desired these pins may be parallel to the axis AB.

Besides, separate coil compression springs 10 have been illustrated to facilitate the understanding of the present invention, but it would not constitute a deparure from the spirit and scope of the invention to substitute a single spring therefor, for example a flat, spider-shaped spring, or a corrugated resilient blade, of which the arms or corrugations would bear against the rolling members 4 in order to preserve the principle of independent spring pressure.

Finally, the cavities receiving these springs may also be secured to an axially movable carrier member so that by using suitable control means the freewheel device can be locked or released at will. In this case, springs may be disposed on either side of the freewheel device so that it can be locked in one and/or the other direction of rotation.

I claim:

1. Freewheel device of the type comprising an inner race member mounted on a shaft, an outer race member, rolling and locking members, such as balls or rollers, urged by spring means against said races, said freewheel device being characterised in that said rolling members urged in a substantially axial direction by separate spring means are housed in separate grooves inclined to axis of said shaft and formed in one of said race members.

2. Freewheel device according to claim 1, characterised in that said outer race member comprises a tapered bore against which balls received in said grooves which are longitudinal and have a substantially semi-circular sectional contour are urged by said spring means, said grooves being formed in said inner race member.

3. Freewheel device according to claim 1, characterised in that said rolling members are received in said grooves which are straight and of substantially semi-circular sectional contour and formed in the surface of said inner race member and directed obliquely with respect to said axis and are disposed with a certain play between the wall of said grooves and a cylindrical bore formed in said outer race member, said play being so predetermined that the relative inclination of the wall of said bore and of the wall of each groove, at the points where the relevant rolling member engages said walls as a consequence of the spring pressure and the groove inclination, be inferior to the frictional angle of the materials constituting said inner and outer race members and said rolling members.

4. Freewheel device according to claim 2, characterised in that each spring acts upon two rolling and locking members between said inner and outer race members of the freewheel device.

References Cited

UNITED STATES PATENTS

| | | | |
|---|---|---|---|
| 557,612 | 4/1896 | Ryder | 192—45 X |
| 2,490,172 | 12/1949 | Swahnberg | 192—45 |
| 3,008,559 | 11/1961 | Forster | 192—45 |
| 3,247,727 | 4/1966 | Digby et al. | 192—45 X |
| 3,279,571 | 10/1966 | Wassilieff | 192—45 X |

MARTIN P. SCHWADRON, *Primary Examiner.*

C. B. DORITY, *Assistant Examiner.*